United States Patent [19]

Townley

[11] Patent Number: 5,267,237
[45] Date of Patent: Nov. 30, 1993

[54] COLLISON DETECTION AND SIGNALING CIRCUIT

[75] Inventor: Alfred T. Townley, Maynard, Mass.

[73] Assignee: Digital Equipment Corporation, Maynard, Mass.

[21] Appl. No.: 909,921

[22] Filed: Jul. 7, 1992

[51] Int. Cl.[5] .................. H04L 12/40; H04L 12/28
[52] U.S. Cl. .................. 370/85.2; 370/85.3
[58] Field of Search .................. 370/85.2, 85.3, 13, 370/85.1; 340/825.5, 825.51

[56] References Cited

U.S. PATENT DOCUMENTS

| | | |
|---|---|---|
| 4,210,780 | 7/1980 | Hopkins et al. |
| 4,561,091 | 12/1985 | Sholl et al. ................. 370/85.3 |
| 4,584,678 | 4/1986 | Ozeki et al. |
| 4,596,011 | 6/1986 | Kobayashi et al. ........ 370/85.3 |
| 4,602,364 | 7/1986 | Herman et al. ............ 370/85.3 |
| 4,888,763 | 12/1989 | Hatfield et al. |
| 5,124,982 | 6/1992 | Kaku .................. 370/85.3 |

Primary Examiner—Wellington Chin
Attorney, Agent, or Firm—Albert P. Cefalo; Ronald C. Hudgens

[57] ABSTRACT

A process and a circuit are described for detecting collisions between packets being transmitted over a network and signaling the detection of collisions. Peak-detection is used to facilitate the detection of collisions. Embodiments of the process and circuit may also include the detection and signaling of packet transmissions by a transceiver coupled to the network. In a preferred embodiment, the detection of collisions and transmissions are signaled by the lighting of a corresponding light-emitting diode for at least a minimum duration.

12 Claims, 5 Drawing Sheets

COLLISON DETECTION AND SIGNALING CIRCUIT

FIELD OF THE INVENTION

The present invention relates to a circuit for detecting collisions on a local area network and signalling the detection of collision.

BACKGROUND OF THE INVENTION

Packet switching is often used to allow multiple computing devices to communicate over a local area network. Using packet switching, a computing device is at all times connected to the network but transmits data in the form of individual packets. In Ethernet systems with data rates of 10 Megabits/second, for example, packets contain approximately 6,000 bits and are approximately 60 microseconds in duration.

Because packets may be transmitted by any computing device on the network, collisions may occur when two devices transmit packets simultaneously. To insure the reliable transmission of data over the network, collisions must be detected so that remedial action, such as retransmission of the colliding packets, may be taken.

One technique for detecting collisions is a listen-while-talk protocol. This system allows a device to begin transmitting a packet if no other transmission is detected on the network. Once the transmission of the packet begins, the transmitting device monitors the network for errors in its own transmission. If a collision occurs, the transmitting device detects an error in its transmission and aborts its transmission. Some such systems, as described in U.S. Pat. No. 4,210,780, impose a random delay on the devices prior to retransmission to avoid continual collisions between multiple devices.

Other methods for detecting collisions on local area networks employ the transmission of collision-detecting packets with each transmission of data. U.S. Pat. No. 4,584,678 describes such a method in which the collision-detecting packets have a predetermined duration and pulse pattern and precede the data packets by a fixed time period. The transmitting station detects collisions by comparing the pattern of pulses which form the collision-detecting packet during transmission with the pattern of pulses actually received.

Another technique for detecting collisions on a packet switching network uses a high-amplitude pulse embedded in the preamble of the packet. In the absence of collisions, the minimum separation between successive high-amplitude pulses is the duration of a packet plus the delay between successive packets. A collision is detected when two high-amplitude pulses violate this minimum separation. Collisions resulting in coincident high-amplitude pulses, however, are not detected by this method. As described in U.S. Pat. No. 4,888,763, such collisions are detected by a secondary examination of the contents of the preamble, which contains a specified code. If the preamble does not contain the specified code upon receipt, a collision is detected.

Accordingly, the above described techniques for detecting collisions require the device to read data from the network in digital format and compare the digital data to an expected value. Some such techniques also require the transmission of specialized collision detection data, or additional circuitry to create and detect specialized collision detection signals.

Therefore, it is desirable to have an inexpensive device that can detect collisions on a local area network without requiring the transmission of a dedicated signal or code. It is further desirable that this device be capable of detecting collisions based solely on the signal observed on the network, without the requirement of digitally comparing data on the network with expected data. Finally, it is desirable that this inexpensive collision detection device include a light emitting diode to signal the detection of collisions.

SUMMARY OF THE INVENTION

A broad aspect of the invention relates to a circuit for detecting collisions between packets being transmitted over a network and signaling the detection of collisions. In a narrower sense, the invention relates to the use of a comparator and a peak detecting circuit to detect packet collisions.

A further aspect of the invention relates to a circuit for detecting the transmission of packets on a network by a transceiver and signaling the detection of the transmission.

In a preferred embodiment, a light-emitting diode is lit, for at least a minimum duration, in response to the detection of packet collisions. A second light-emitting diode is lit, also for at least a minimum duration, in response to the detection of a packet transmission by a transceiver.

A further aspect of the invention relates to a process for detecting collisions between packets being transmitted over a network and signaling the detection of collisions. Another aspect of the invention relates to a process for detecting the transmission of packets on a network by a transceiver and signaling the detection of the transmission.

These and other features and advantages of the present invention will become apparent from a reading of the detailed description in conjunction with the attached drawings.

DETAILED DESCRIPTION OF THE PREFERRED EMBODIMENT

The disclosed invention detects collisions on a network resulting from overlapping transmissions by multiple nodes on a network, and activates a signaling device to signal the detection of collisions. The basic environment within which the invention operates is illustrated in the block diagram of FIG. 1.

Figure 1:
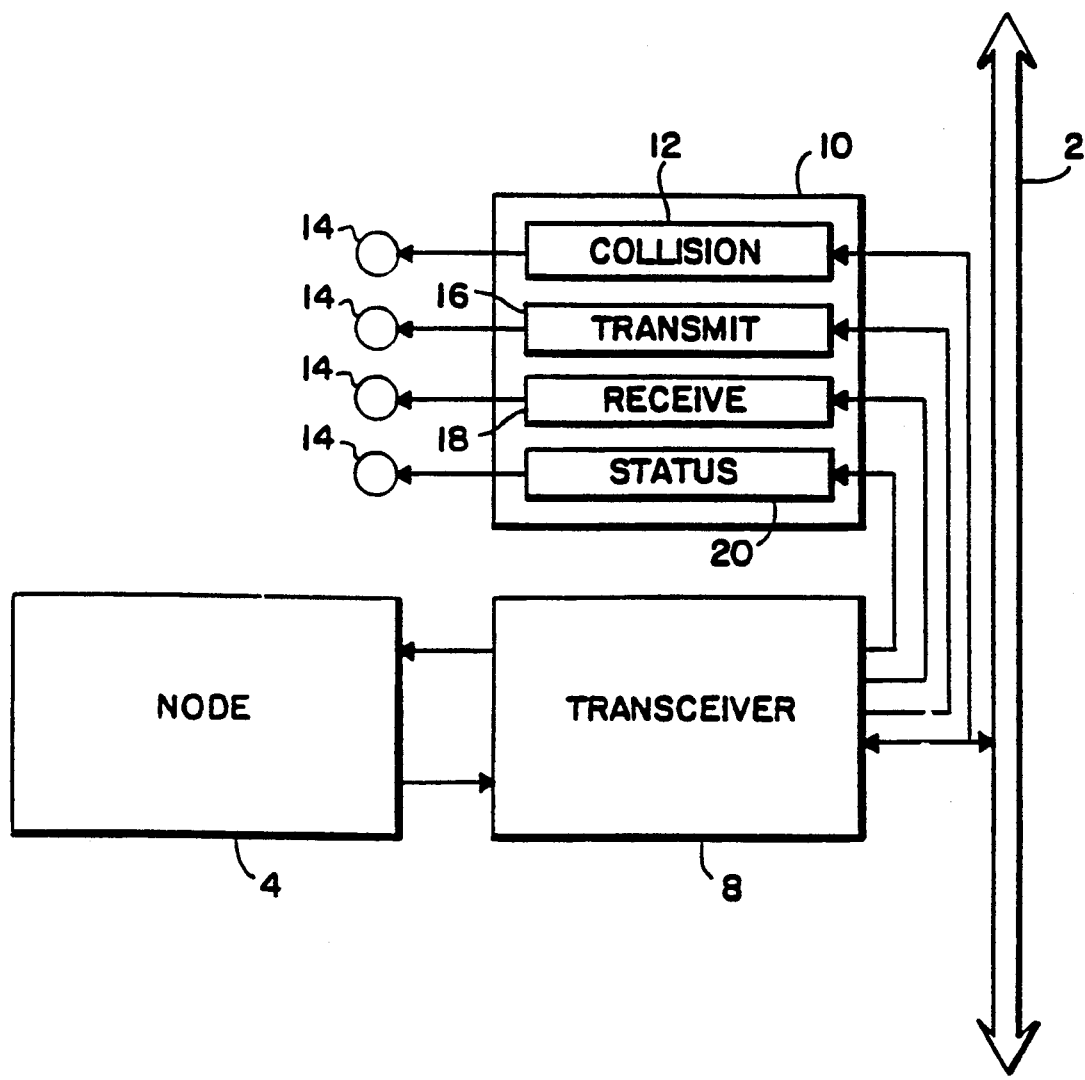
FIG. 1 is a block diagram showing the collision and transmit detectors in the context of a network environment.
Figure 3:
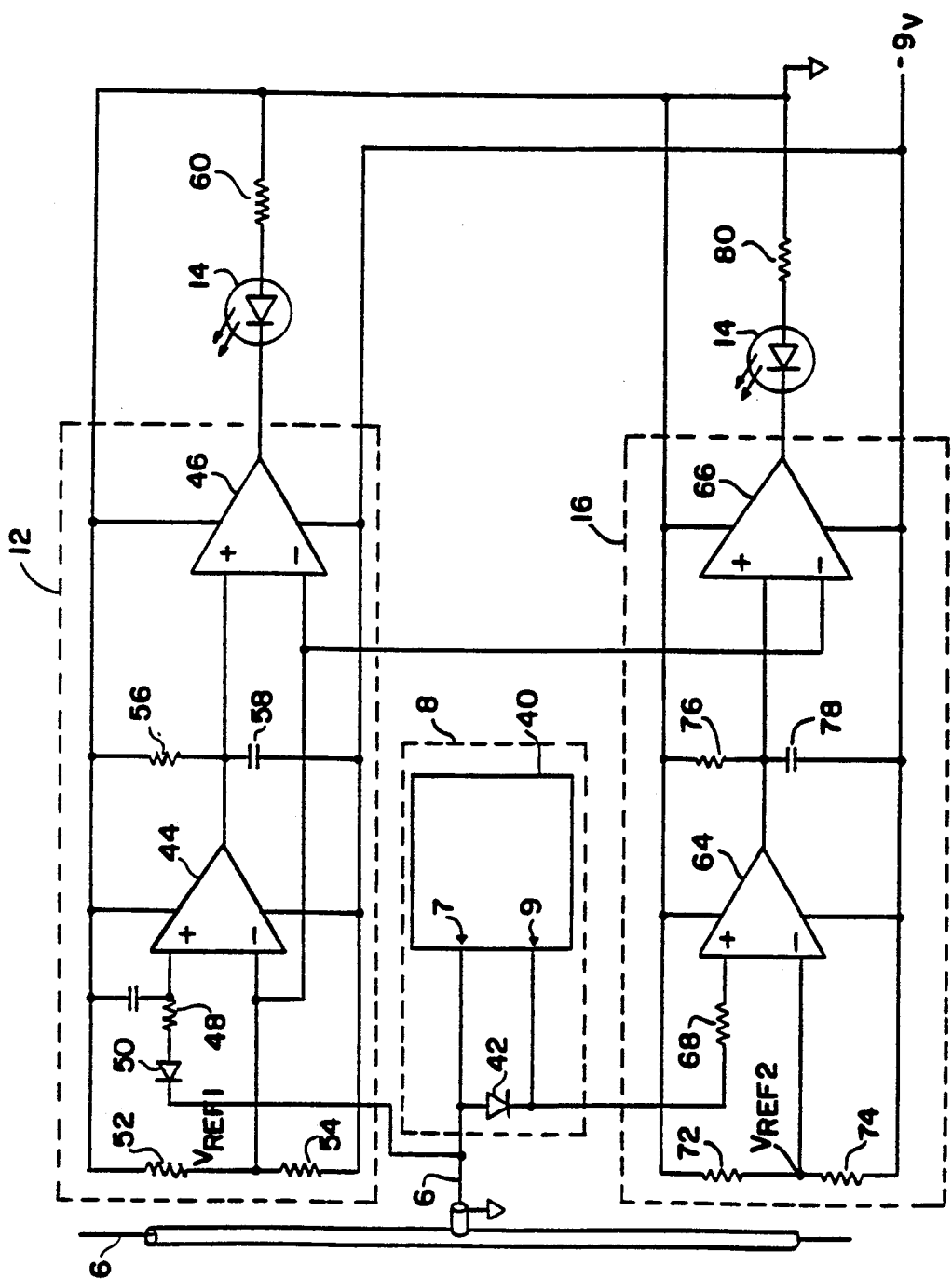
FIG. 3 is a schematic diagram of a circuit according to the principles of the invention.

FIG. 1 shows a network 2 which carries electrically encoded messages, also known as packets, among nodes 4 which are tied to the network 2. In a preferred embodiment, the network 2 is a local area network, such as ETHERNET, and physically comprises a coaxial wire. The center conductor of the coaxial wire, which carries the network signals, is referred to as the medium, and is shown in FIG. 3 as element 6. The node 4, which is typically a digital computer, may send or receive packets to or from other nodes on the network 2.

As shown in FIG. 1, the node 4, instead of being connected directly to the network 2, is coupled to the network 2 through a transceiver 8. The transceiver 8 translates the electrical waveforms carried by the medium 6 into signals which are more suitable for interpretation by the node 4. For example, in the embodiment shown in Figure 1, the signals carried between the node 4 and the transceiver 8 are square waves which alternate between +1.0 volt and −1.0 volt. The transceiver 8 also translates packets being sent from the node 4, which are encoded in a +/−1.0 volt square wave signal, into the corresponding electrical waveforms carried by the medium 6.

As shown in FIG. 1, a detector group 10 works in conjunction with the transceiver 8 to detect and signal the status of the network 2 and the transceiver 8. The collision detector 12 monitors the medium 6 and activates a light-emitting diode 14 when two or more packets collide on the network 2. The mechanism for detecting and signaling such collisions is described in more detail in conjunction with FIGS. 3 and 4. In place of, or in addition to, the light-emitting diode, the collision detector 12 may signal a collision with other visible or audible means, such as with a liquid crystal display or a speaker. Similarly, the collision detector 12 may be coupled to a data storage device (not shown) to record the collision history of the network 2.

As shown in FIG. 1, the detector group 10 also includes a transmit detector 16, a receive detector 18, and a status detector 20. The transmit detector 16 monitors the transceiver 8 and activates a light-emitting diode 14 when the transceiver 8 transmits a packet. The receive detector 18 activates a light-emitting diode 14 when the transceiver 8 detects a packet on the network 2, and the status detector 20 activates a light-emitting diode 14 when power is supplied to the transceiver 8. In place of, or in addition to, the light-emitting diode, the transmit, receive, and status detectors 14, 18, and 20 may signal their respective detections by other visible, audible, or data storage means, similar to those described for the collision detector 12.

Figure 2A:
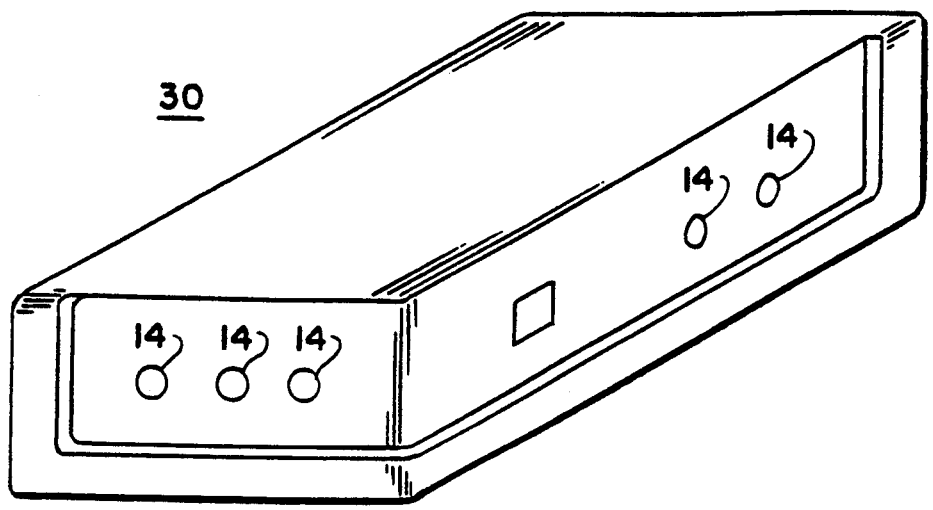
FIG. 2A is an isometric diagram of the front of an enclosure with a transceiver and a circuit according to the principles of the invention.
Figure 2B:
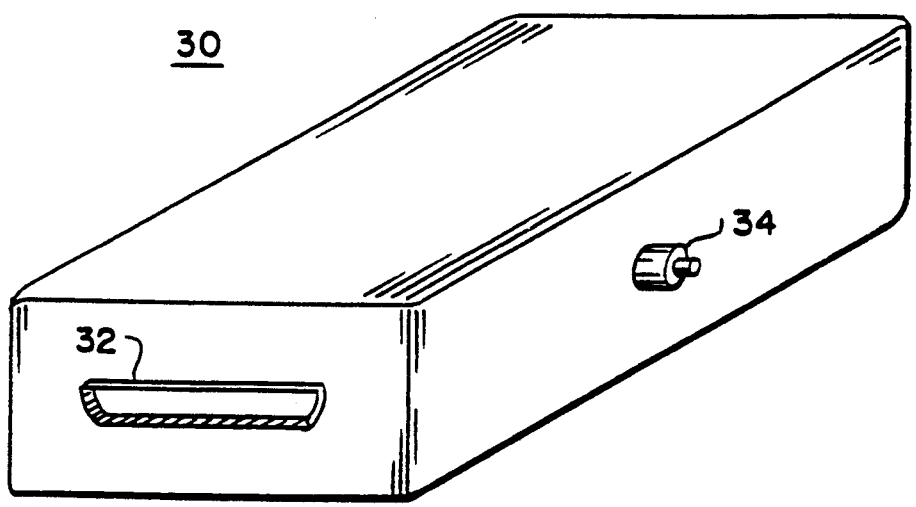
FIG. 2B is an isometric diagram of the rear of the enclosure of FIG. 2A.

FIGS. 2A and 2B show a transceiver/detector assembly 30 according to the invention. Housed within the transceiver/detector assembly 30 is the transceiver 8, the detector group 10, and the light-emitting diodes 14 of FIG. 1. Also part of the transceiver/detector assembly 30 are ports 32 and 34 for connection to the network node 4 and to the network 2 respectively. The embodiment shown in FIGS. 2A and 2B may be plugged directly into a connector (not shown) on the network node 4, without the need for a connecting cable. As shown in FIG. 2A, the light emitting diodes 14 extend to the outer portion of the transceiver/detector assembly 30 such that they may be viewed by the user of the network node 4.

Alternatively, the transceiver 8 and detector block 10 may be housed in separate enclosures (not shown.) The detector block 10 may also be housed within the enclosure containing the network node 4. In such a configuration, the light-emitting diodes 14, or other signaling means, may be made visible or otherwise accessible through apertures in the network node enclosure (not shown,) as appropriate.

FIG. 3 shows a circuit embodying the collision detector 12 and the transmit detector 16. As shown, the circuit of FIG. 3 includes a transceiver 8 which is based on a DP8392 integrated circuit 40 manufactured by National Semiconductor. An input port 7 of the transceiver 8 is connected to the medium 6, allowing the transceiver 8 to receive packets transmitted on the medium 6. An output port 9 of the transceiver 8 is connected to the medium 6 through a rectifier diode 42, the cathode terminal of the diode 42 being connected to the transceiver 8. The transceiver 8 normally holds the voltage potential of the cathode terminal of the diode 42 at ground. The diode 42 insulates the medium 6, which carries negative-going signals, from the transceiver 8. During a transmission, however, the transceiver 8 selectively asserts negative voltages at the cathode terminal of the diode 42, thus transmitting a packet on the medium 6.

The collision detector 12 includes two comparators 44 and 46, each of which are supplied by voltages of ground and −9 volts. The positive input port of the first of the two collision comparators 44 is connected, through a resistor 48, to the anode terminal of a rectifier diode 50. The cathode terminal of the diode 50 is connected to the medium 6. The negative input port of the first collision comparator 44 is connected between voltage divider resistors 52 and 54. The voltage potential produced by the voltage divider is labeled as $V_{ref1}$. The output port of the first collision comparator 44 is connected to the positive input port of the second collision comparator 46. The output of the first collision comparator 44 is modified by a pulse stretcher, formed by resistor 56 and capacitor 58. The negative input port of the second collision comparator 46 is supplied by a reference voltage, which in FIG. 3 is also generated by the voltage divider resistors 52 and 54. The output port of the second collision comparator 46 is then connected to the cathode terminal of the collision detection light-emitting diode 14, whose anode terminal is connected to ground through a resistor 59.

The transmit detector 16, like the collision detector 12, includes two comparators 64 and 66, each of which are supplied by voltages of ground and −9 volts. The positive input port of the first of the two transmit comparators 64 is connected, through a resistor 68, to the transceiver output port 9. The negative input port of the first transmit comparator 64 is connected between voltage divider resistors 72 and 74. The voltage potential generated by the voltage divider is labeled $V_{ref2}$. The output of the first transmit comparator 64 is connected to the positive input port of the second transmit comparator 66. The output of the first transmit comparator 64 is modified by a pulse stretcher, formed by resistor 76 and capacitor 78. The negative input of the second comparator 66 is supplied by a reference voltage, $V_{ref1}$, which in FIG. 3 is also generated by collision detector voltage divider resistors 52 and 54. This reference voltage may be generated independently from the collision voltage divider, but $V_{ref1}$ is used in the embodiment of FIG. 3 to reduce the component count. The output port of the second transmit comparator 66 is then connected to the cathode terminal of the transmit detection light-emitting diode 14, whose anode terminal is connected to ground through resistor 79.

The comparators 44, 46, 64, and 66 in the circuit of FIG. 3 are LM339 integrated circuits. The first comparators 44 and 64 for each the collision and transmit detectors 12 and 16 must have input impedances sufficiently high to preserve the signal integrity of the medium 6. Generally, for ETHERNET, the input impedance must exceed 7.5 KΩ at 10 Mhz, and exceed 250 KΩ at DC. The LM339 satisfies these criteria. The LM339 offers an additional functional advantage by bleeding off charge from the diode 50 at the positive input of the first collision comparator 44. This is discussed further in conjunction with FIG. 4.

Figure 4:
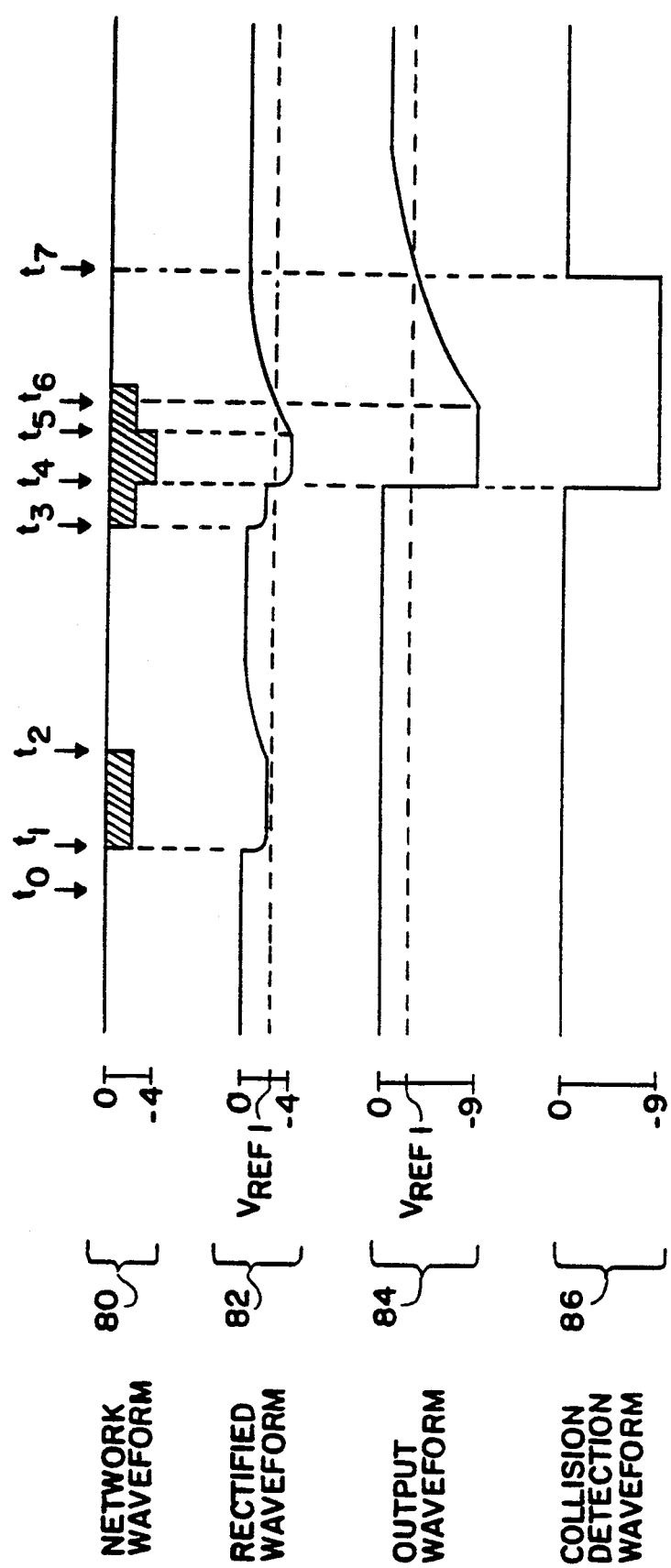
FIG. 4 is a timing diagram of selected waveforms related to the detection and signaling of collisions from the circuit of FIG. 3.

FIG. 4 shows a timing diagram of four waveforms for the collision detector 12. From top to bottom, the diagram includes the network waveform 80, the peak waveform 82, the output waveform 84, and the collision detection waveform 86. The network waveform 80 represents the voltage potential of the medium 6 during the transmission of packets on the network 2. The peak waveform 82 represents the voltage potential at the positive input port of the first collision detector comparator 44. The output waveform 84 represents the voltage potential at the output port of the first collision detector comparator 44 and at the positive input port of the second collision detector comparator 46. The collision detection waveform 86 represents the voltage potential applied to the cathode terminal of the light-emitting diode 14 for the collision detector 12.

At time $t_0$ on the network waveform 80, FIG. 4 shows the medium 6 to have a voltage potential at ground. This indicates that no packets transmissions are detectable by the transceiver 8. Under this condition, the peak waveform 82 is also at ground. The reference voltage $V_{ref1}$ is shown to be approximately $-2.1$ volts, as produced by voltage divider resistors 52 and 54 having values of approximately 10 KΩ and 3 KΩ respectively. With the peak waveform 82 at a voltage above $V_{ref1}$, the output waveform 84 is held at the ground potential. With the output waveform 84 also at a voltage above $V_{ref1}$, the collision detection waveform 86 is also held at the ground potential. The value of $V_{ref1}$ is chosen such that normal packets on the medium x maintain a network waveform x voltage above $V_{ref1}$, but that colliding packets create a voltage below $V_{ref1}$.

At time $t_1$, a packet is transmitted on the network 2, resulting in a signal between ground and approximately $-2$ volts on the medium 6. Between times $t_1$ and $t_2$, the negative-going signals of the network waveform 80 drive the peak waveform 82 to a voltage of approximately $-1.2$ volts. The diode 50 at the positive input of the first collision comparator 44 acts as a peak detector, holding the negative-going voltage extremes achieved by the network waveform 80. After the packet has passed, at time $t_2$, the peak waveform 82 decays toward ground as leakage current is drawn from the positive input of the first collision comparator 44.

A low-cost comparator, such as the LM339 integrated circuit used in the circuit of FIG. 3, requires that the voltage at its inputs be separated by 1.5 volts or more from the respective voltage rail for proper operation. In the embodiment of FIG. 3, this requires that $V_{ref1}$ be less than $-1.5$ volts. This insures that the positive input of the first collision comparator 44 is more than 1.5 volts from ground when it crosses the reference voltage $V_{ref1}$. During some collisions between packets on the network 2, however, the average voltage does not fall below $-1.48$ volts. Therefore, an averaging circuit at the input of the first collision comparator 44, without the peak-detecting diode 50, would fail to detect these collisions. One alternative is to use a more expensive comparator which allows $V_{ref1}$ to be closer to ground. The use of the peak-detecting diode 50, however, avoids the problem of undetected collisions while still allowing the use of a low-cost comparator, such as the LM339.

At time $t_3$, the beginning of a packet transmission is again shown, and the network waveform 80 reacts as described above. At time $t_4$, however, a second packet transmission begins, overlapping with the first. The resulting network waveform 80 varies between ground and approximately $-4$ volts, which drives the peak waveform 82 to approximately $-3.2$ volts, due to the voltage drop across the diode 50. When the peak waveform 82 falls below $V_{ref1}$, the first collision comparator 44 pulls the output waveform 84 to the low supply voltage of approximately $-9$ volts. With the voltage of the positive input port of the second collision comparator 44 below $V_{ref1}$, the collision detection waveform 86 is also pulled to the low supply voltage of approximately $-9$ volts. The voltage potential generated across the collision light-emitting diode 14 by the collision detection waveform 86 causes the collision light-emitting diode 14 to be lit.

At time $t_5$, the first packet transmission is completed, reducing the network waveform 80 to a minimum of approximately $-2$ volts. The peak waveform 82 then rises toward its potential prior to the packet overlap, $-1.2$ volts. This rise in voltage is due to a leakage current drawn from the positive input port of the first collision comparator 44. At time $t_6$, the peak waveform 82 rises past the $V_{ref1}$ threshold. With its positive input exceeding its negative input, the first collision comparator 44 increases its output voltage toward its high supply voltage, which is at ground. The rise time of the output waveform 84 is increased by a pulse stretcher formed from a resistor 56 and a capacitor 58. The pulse stretcher is used to lengthen the time during which the collision light-emitting diode 14 is lit in response to a collision, to insure that it is visible to a person who is observing the collision light-emitting diode 14. In the embodiment of FIG. 3, the values of the resistor 56 and capacitor 58 are, respectively, 100 KΩ and 0.1 μf, resulting in a time constant of 10 Ms.

At time $t_7$, the output waveform 84 exceeds the $V_{ref1}$ threshold, causing the positive input of the second collision comparator 46 to exceed its negative input. The voltage differential applied across the collision light-emitting diode 14 is thereby removed at time $t_7$. Thus, in response to the collision between two packets, the collision light-emitting diode 14 is lit from approximately time $t_4$ through time $t_7$. Due to the pulse stretching effect of the resistor 56 and capacitor 58, the collision light-emitting diode 14 may remain lit for more than 1000 times longer than the duration of a collision. This precludes the collision light-emitting diode 14 from indicating the precise number of collisions, but allows it to remain lit long enough for a person observing to easily see the collision light-emitting diode 14 and to note the relative frequency with which collisions occur.

To improve the clarity of timing diagram, the horizontal time scale of FIG. 4, including time points $t_0$ through $t_7$, is not linear. Using the embodiment of FIG. 3, the relative times shown in FIG. 4 are approximately as follow:

$$t_2 = t_1 + 60\mu s$$

$$t_4 = t_3 + 40\mu s$$

$t_5 = t_3 + 55 \mu s$ $t_6 = t_3 + 100 \mu s$ $t_7 = t_3 + 10.1 \mu s$

Figure 5:
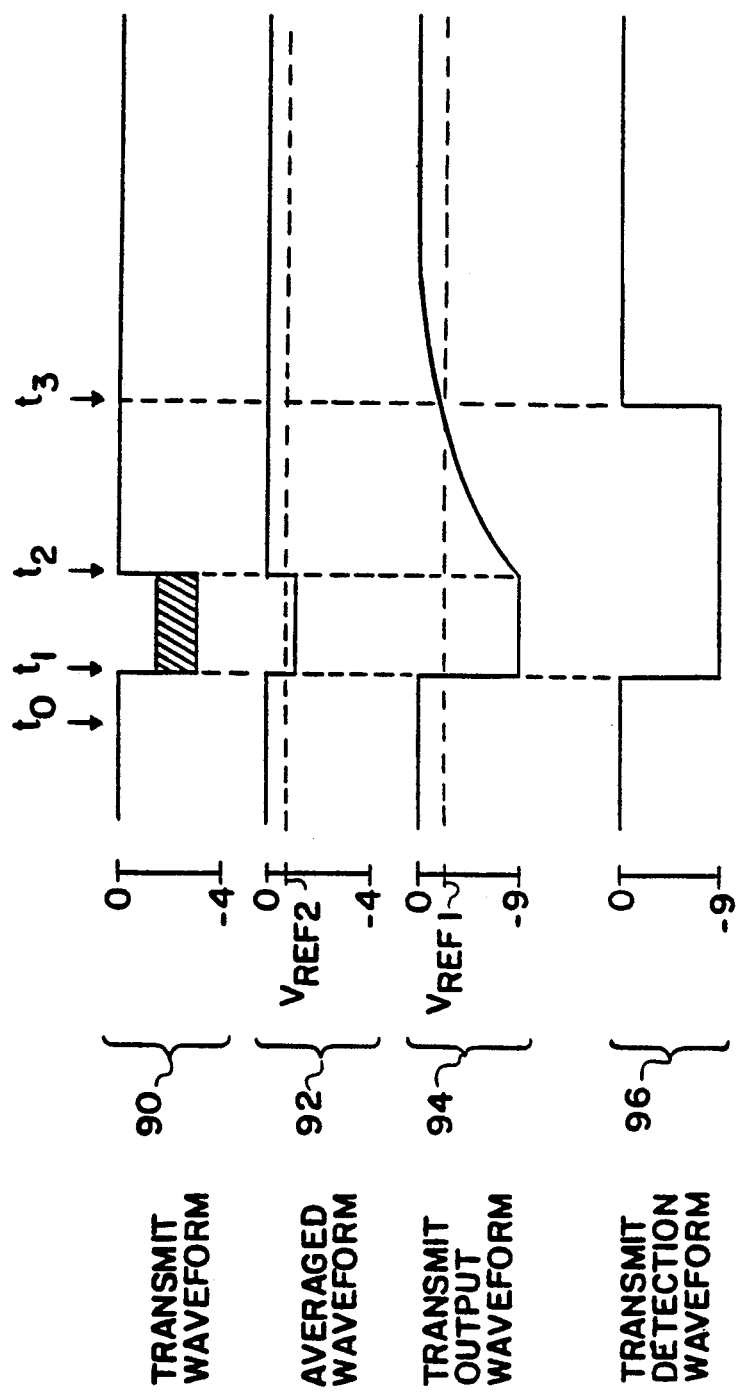
FIG. 5 is a timing diagram of selected waveforms related to the detection and signaling of transmissions from the circuit of FIG. 3.

FIG. 5 shows a timing diagram of four waveforms for the transmit detector 16. From top to bottom, the diagram includes the transmit waveform 90, the averaged waveform 92, the transmit output waveform 94, and the transmit detection waveform 96. The transmit waveform 90 represents the voltage potential applied to the cathode of diode 42 of FIG. 3 by the transceiver 8 during the transmission of a packet by the transceiver 8. The averaged waveform 92 represents approximately the average of the transmit waveform 90, and is measured at the positive input of the first transmit comparator 64. The transmit output waveform 94 represents the voltage potential at the output of the first transmit detector comparator 64 and at the positive input of the second transmit detector comparator 66. The transmit detection waveform 96 represents the voltage potential applied to the cathode terminal of the light-emitting diode 14 for the transmit detector 16.

As shown at time t₀ in FIG. 5, the transceiver 8 maintains a voltage potential of ground at the cathode terminal of the diode 42 during periods when the transceiver 8 is not transmitting packets on the network 2. The reference voltage $V_{ref2}$ is shown to be approximately −1.8 volts, as produced by voltage divider resistors 72 and 74 having values of approximately 10 KΩ and 2.49 KΩ respectively. With the averaged waveform 92 at a voltage above $V_{ref2}$, the transmit output waveform 94 is held at the ground potential. The value of $V_{ref2}$ is chosen such that the voltage of the averaged waveform 92 is less than $V_{ref2}$ only while the transceiver 8 is transmitting packets on the network 2. With the transmit output waveform 94 also at a voltage above $V_{ref1}$, the collision detection waveform 96 is also held at the ground potential.

At time t₁, the transceiver 8 begins transmitting a packet and asserts a signal which causes the transmit waveform 90 to vary between approximately −0.8 volts and −3 volts. In response to the transmit waveform 90, the averaged waveform 92 drops from ground to approximately −1.9 volts, as shown in FIG. 5. As the transmit waveform 90 drops below the reference voltage $V_{ref2}$ the first transmit comparator 64 pulls the transmit output waveform 94 to the low supply voltage of approximately −9 volts. With the positive input of the second transmit comparator 66 below $V_{ref1}$, the transmit detection waveform 96 is also pulled to the low supply voltage of approximately −9 volts. The voltage potential generated across the transmit light-emitting diode 14 by the transmit detection waveform 96 causes the transmit light-emitting diode 14 to be lit.

At time t₂, the transceiver 8 completes its transmission and reasserts a ground potential on the transmit waveform 90. With its positive input exceeding its negative input, the first transmit comparator 64 increases its output voltage toward its high supply voltage, which is at ground. The rise time of the transmit output waveform 94 is increased by a pulse stretcher formed from a resistor 76 and a capacitor 78. The pulse stretcher is used to lengthen the time during which the transmit light-emitting diode 14 is lit in response to a transmission by the transceiver 8 to insure that it is visible to a person who is observing the transmit light-emitting diode 14. In the embodiment of FIG. 3, the values of the resistor 76 and capacitor 78 are, respectively, 100 KΩ and 0.1 μf, resulting in a time constant of 10 ms.

At time t₃, the transmit output waveform 94 exceeds the $V_{ref1}$ threshold, causing the positive input of the second transmit comparator 66 to exceed its negative input. The voltage differential applied across the transmit light-emitting diode 14 is thereby removed at tine t₃. Thus, in response to the transmission by the transceiver 8, the transmit light-emitting diode 14 is lit from approximately time t₁ through time t₃. Similar to the operation of the collision light-emitting diode 14, the transmit light-emitting diode 14 is lit for a duration to allow it to be easily observed by a person.

To improve the clarity of timing diagram, the horizontal time scale of FIG. 5, including time points t₀ through t₃, is not linear. Using the embodiment of FIG. 3, the times shown in FIG. 5 are approximately as follows:

$, t_2 = t_1 + 60 \mu s$ $, t_3 = t_1 + 10.06 \, ms$

It is apparent that, within the scope of the invention, modifications and different arrangements may be made other than as herein disclosed. The present disclosure is merely illustrative, the invention comprehending all variations thereof.

WHAT IS CLAIMED IS:

1. A circuit for detecting collisions between packets being transmitted on a network comprising:
   a network having a network medium for carrying packets being transmitted on the network, the packets producing a network signal on the network medium;
   a voltage comparator having positive and negative input ports and an output port;
   a rectifier diode having an anode terminal and a cathode terminal, the anode terminal being coupled to the positive input port of the voltage comparator and the cathode terminal being coupled to the network medium, the voltage comparator having a high input impedance effective to prevent the voltage comparator from electrically disturbing the network medium;
   means for generating a reference voltage having an output coupled to the negative input port of the voltage comparator, the reference voltage being lower than the voltage achieved at the positive input port of the voltage comparator during collision-free operation of the network and a higher voltage than the voltage achieved at the positive input port of the voltage comparator during a collision between packets on the network, the voltage comparator producing an output signal at its output port when the voltage at its positive input port is lower than the reference voltage; and
   means for signaling the detection of a collision, the signaling means being responsive to the output signal of the voltage comparator.

2. The circuit of claim 1 wherein the signaling means comprises a light-emitting diode.

3. The circuit of claim 2 further comprising a pulse stretcher coupled to the output port of the comparator, the pulse stretcher being effective to sustain the output signal of the voltage comparator for a specified duration.

4. The circuit of claim 3 where in the signaling means further comprises:

another comparator, the other comparator having positive and negative input ports and an output port, the positive input port of the other comparator being coupled to the output port of the comparator and the output port of the other comparator being coupled to the signaling means; and means for generating another reference voltage having an output coupled to the negative input port of the other comparator, the voltage at the positive input port of the other comparator normally being higher than the other reference voltage, the output signal of the voltage comparator causing the voltage at the positive input port of the other comparator to be lower than the other reference voltage, the output of the other comparator activating the signaling means when the voltage of at the positive input port of the other comparator is less than the other reference voltage.

5. The circuit of claim 1 further comprising:

a transceiver for transmitting packets on the network comprising an input port, an output port, and a transmit diode, the transmit diode having anode and cathode terminals, the anode terminal of the transmit diode being coupled to the network and to the input port of the transceiver, the cathode terminal of the transmit diode being coupled to the output port of the transceiver;

a transmit voltage comparator having positive and negative input ports and an output port, the positive input port being coupled to the cathode terminal of the transmit diode;

means for generating a transmit reference voltage having an output coupled to the negative input port of the transmit voltage comparator, the transmit reference voltage being lower than the voltage achieved at the positive input port of the transmit voltage comparator during periods when the transceiver is not transmitting packets on the network and higher than the voltage achieved at the positive input port of the transmit voltage comparator during periods when the transceiver is transmitting packets on the network, the transmit voltage comparator producing an output signal at its output port when the voltage at its positive input port is lower than the transmit reference voltage; and means for signaling the detection of a transmission by the transceiver of packets on the network, the transmission signaling means being responsive to the output signal of the transmit voltage comparator.

6. The circuit of claim 5 wherein transmission signaling means comprises a light-emitting diode.

7. The circuit of claim 6 further comprising a transmit pulse stretcher coupled to the output port of the transmit comparator, the transmit pulse stretcher being effective to sustain the output signal of the transmit voltage comparator for a specified duration.

8. The circuit of claim 7 wherein the transmission signaling means further comprises:

another transmit comparator, the other transmit comparator having positive and negative input ports and an output port, the positive input port of the other transmit comparator being coupled to the output port of the transmit comparator and the output port of the other transmit comparator being coupled to the transmission signaling means; and means for generating another transmit reference voltage having an output coupled to the negative input port of the transmit comparator, the voltage at the positive input port of the other transmit comparator normally being higher than the other transmit reference voltage, the output signal of the transmit voltage comparator causing the voltage at the positive input port of the other transmit comparator to be lower than the other transmit reference voltage, the output of the other transmit comparator activating the transmission signaling means when the voltage of at the positive input port of the other transmit comparator is less than the other transmit reference voltage.

9. A process for detecting collisions between packets being transmitted on a network comprising:

providing a network having a network medium carrying packets being transmitted on the network, the packets producing a network signal having peaks on the network medium;

generating a reference voltage, the reference voltage being lower than the voltage magnitude of the peak of the network signal during collision-free operation of the network, the reference voltage being higher than the voltage magnitude of the peak of the network signal during a collision between packets on the network;

detecting the voltage magnitude of the peak of the network signal;

comparing the voltage magnitude of the peak of the network signal with the reference voltage; and signaling the detection of a collision between packets on the network when the reference voltage exceeds the voltage magnitude of the peak of the network signal.

10. The process of claim 9 wherein signaling comprises lighting a light-emitting diode.

11. The process of claim 10 further comprising:

providing a transceiver for transmitting packets on the network comprising an input port and an output port;

generating a transmit reference voltage, the transmit reference voltage being lower than the voltage achieved at the transceiver output port during periods when the transceiver is not transmitting packets on the network and a higher voltage than the voltage achieved at the transceiver output port during periods when the transceiver is transmitting packets on the network;

comparing the voltage at the transceiver output port with the reference voltage; and signaling the detection of a transmission of a packet on the network by the transceiver when the voltage at the transceiver output port is less than the reference voltage.

12. The process of claim 11 wherein signaling the detection of a transmission comprises lighting a light-emitting diode.

* * * * *

UNITED STATES PATENT AND TRADEMARK OFFICE
CERTIFICATE OF CORRECTION

PATENT NO. : 5,267,237  
DATED : November 30, 1993  
INVENTOR(S) : Townley

Page 1 of 1

It is certified that error appears in the above-identified patent and that said Letters Patent is hereby corrected as shown below:

Title page, Item [54] and Column 1, line 1,
"COLLISON" should be -- COLLISION --.

Signed and Sealed this

Twenty-first Day of May, 2002

*Attest:*

*Attesting Officer*

JAMES E. ROGAN
*Director of the United States Patent and Trademark Office*